(12) United States Patent
Dickson et al.

(10) Patent No.: US 8,015,593 B2
(45) Date of Patent: Sep. 6, 2011

(54) PROTECTING SECRET DATA ENTRY FROM INFRARED AND AUDIO EAVESDROPPING

(75) Inventors: Bruce Dickson, Raleigh, NC (US); David Louis Kaminsky, Chapel Hill, NC (US); Marcia Lambert Peters Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/106,782

(22) Filed: Apr. 21, 2008

(65) Prior Publication Data

US 2009/0326732 A1    Dec. 31, 2009

Related U.S. Application Data

(63) Continuation of application No. 11/942,548, filed on Nov. 19, 2007, now Pat. No. 7,899,325, which is a continuation of application No. 09/396,873, filed on Sep. 15, 1999, now Pat. No. 7,362,973.

(51) Int. Cl.
  *G06F 7/04* (2006.01)
  *G08B 21/00* (2006.01)
  *H04B 10/00* (2006.01)
(52) U.S. Cl. ............... 726/2; 398/40; 340/540
(58) Field of Classification Search .......... 398/40; 726/2, 20; 340/540
See application file for complete search history.

(56) References Cited

U.S. PATENT DOCUMENTS

| | | | |
|---|---|---|---|
| 4,052,720 A | 10/1977 | McGregor et al. | |
| 4,727,655 A | 3/1988 | Jacobi, Jr. | |
| 5,025,255 A | 6/1991 | Mould | |
| 5,075,606 A | 12/1991 | Lipman | |
| 5,239,792 A | 8/1993 | Avni | |
| 5,241,699 A | 8/1993 | Barsumian | |
| 5,272,754 A | 12/1993 | Boerbert | |
| 5,533,131 A | 7/1996 | Kury | |
| 5,563,182 A | 10/1996 | Epstein et al. | |
| 5,611,608 A | 3/1997 | Clausen | |
| 5,717,430 A * | 2/1998 | Copland et al. | 345/168 |
| 5,748,728 A | 5/1998 | Ginsberg et al. | |
| 5,761,329 A | 6/1998 | Chen et al. | |
| 5,778,081 A | 7/1998 | Patrick | |

(Continued)

OTHER PUBLICATIONS

Fan Noise Solutions; www.pcsilencioso.com/cpemma/index.html.

(Continued)

*Primary Examiner* — Christopher J Brown
(74) *Attorney, Agent, or Firm* — Stevens & Showalter LLP

(57) ABSTRACT

A method for protecting a data entry device from eavesdropping includes masking a signature of entry resulting from entry of data by a user of the data entry device so as to reduce the detectability of the signature by eavesdropping. The signature may include a temperature differential in the data entry device from data entry by the user and the masking may include controlling the external temperature of the data entry device to reduce temperature differentials left in the data entry device by the user. Alternatively, the signature may include sound waves emitted from the data entry device and the masking may include masking sound waves emitted from the data entry device to reduce the detectability of the sound waves. A system may also be employed for protecting data entry to a data entry device from eavesdropping. The system includes a data entry device and means for masking a signature of entry resulting from entry of data by a user of the data entry device so as to reduce the detectability of the signature by eavesdropping.

5 Claims, 7 Drawing Sheets

U.S. PATENT DOCUMENTS

| | | | |
|---|---|---|---|
| 5,828,016 | A | 10/1998 | Grannan et al. |
| 5,828,034 | A * | 10/1998 | Chang .......................... 219/209 |
| 5,872,849 | A | 2/1999 | Sudia |
| 5,914,701 | A | 6/1999 | Gersheneld et al. |
| 6,188,771 | B1 * | 2/2001 | Horrall .......................... 381/73.1 |
| 6,232,994 | B1 * | 5/2001 | Wiklof .......................... 347/177 |
| 6,798,887 | B1 | 9/2004 | Andre |
| 7,362,973 | B1 | 4/2008 | Dickson et al. |
| 2008/0072331 | A1 | 3/2008 | Dickson et al. |

OTHER PUBLICATIONS

Christopher J. Brown; Office Action—Non-final Rejection in U.S. Appl. No. 09/396,873; Aug. 11, 2003; U.S. Patent and Trademark Office; Alexandria, VA.

Christopher J. Brown; Office Action—Final Rejection in U.S. Appl. No. 09/396,873; Feb. 17, 2004; U.S. Patent and Trademark Office; Alexandria, VA.

Christopher J. Brown; Office Action—Final Rejection in U.S. Appl. No. 09/396,873; Nov. 2, 2005; U.S. Patent and Trademark Office; Alexandria, VA.

Christopher J. Brown; Office Action—Non-final Rejection in U.S. Appl. No. 11/942,548; Jun. 8, 2009; U.S Patent and Trademark Office; Alexandria, VA.

Christopher J. Brown; Office Action—Non-final Rejection in U.S. Appl. No. 11/942,548;Nov. 17, 2009; U.S. Patent and Trademark Office; Alexandria, VA.

Christopher J. Brown; Office Action—Final Rejection in U.S. Appl. No. 11/942,548; Apr. 21, 2010; U.S. Patent and Trademark Office; Alexandria, VA.

* cited by examiner

PROTECTING SECRET DATA ENTRY FROM INFRARED AND AUDIO EAVESDROPPING

CROSS REFERENCE TO RELATED APPLICATION

This application claims priority to and is a continuation of U.S. Ser. No. 09/396,873, now issued as U.S. Pat. No. 7,362,973, entitled PROTECTING SECRET DATA ENTRY FROM INFRARED AND AUDIO EAVESDROPPING, filed on Sep. 15, 1999, and further claims priority to and is a continuation of U.S. Ser. No. 11/942,548, entitled PROTECTING SECRET DATA ENTRY FROM INFRARED AND AUDIO EAVESDROPPING, filed Nov. 19, 2007, now issued as U.S. Pat. No. 7,899,325, which is a continuation of U.S. Ser. No. 09/396,873, now issued as U.S. Pat. No. 7,362,973, the entire disclosure of each of these documents is incorporated by reference herein.

FIELD OF THE INVENTION

This invention relates to methods and systems for protecting secret data entry from infrared and audio eavesdropping.

BACKGROUND OF THE INVENTION

In today's emerging information society, more and more personal and proprietary information is stored in electronic databases. To prevent unauthorized access to these private databases, many electronic systems, computers, and networks require users to enter secret data to initialize a security relationship. While efforts have been made to utilize biological characteristics as secret data, through methods such as voice identification or retinal scanning, widespread use of these methods is years, if not decades, away. The predominant method for providing secret data remains the use of a data entry device, typically a keyboard or keypad, to enter secret data, such as a password or PIN (Personal Identification Number). Entry of the proper secret data initializes a security relationship.

The types of security relationships that are established by means of shared secrets include, but are not limited to, authentication, encryption, and digital signing. In authentication, the possession of the secret verifies the identity of the possessor. In encryption, the secret is used to cryptographically transform a message so it is concealed from third parties but may be transformed back into readable form by one possessing a related secret. In digital signing, a hash is computed over a block of data. The hash is then encrypted with the private cryptographic key of the signer. The signature can be tested by decrypting the signature with the public cryptographic key of the signer and comparing the result to a just-computed hash of the data block. If these values match, it shows that the signer had the private key corresponding to the public key and also that the data block has not changed.

Authentication credentials are often divided into two parts so that security is not compromised even if one part is lost or stolen. For example, a person wishing to transact business at an Automatic Teller Machine generally identifies himself or herself by presenting an "ATM card" and concurrently entering a string of numbers called a "PIN" (Personal Identification Number) onto a keypad. The "ATM card" bears identifying information, such as an account number, encoded on a magnetic stripe. A person possessing only half of the secret, only the ATM card or only the secret PIN, is not authorized to perform transactions. Similarly, home security systems rely on the authorized entrant to possess both a key to the house and a security system PIN. An authorized entrant generally disables a home security system alarm by using a keypad to enter a secret string of numbers. If a person entering the house fails to enter the correct PIN within a short period of time, the alarm system may automatically summon law enforcement personnel to apprehend the unauthorized person.

While many systems divide authentication credentials into a tangible object and a password or PIN, many systems rely solely on a password or PIN for authentication. For example, new short-range wireless data communications systems, such as the Bluetooth standard, use a PIN to generate a link key. The link key serves for authentication and encryption allowing secure communication between a pair of devices. Similarly, passwords are commonly used to secure access to computers and networks. For systems that rely entirely on a password or PIN for authentication, the security of the entire system may be adversely affected if the password or PIN is lost, stolen, or otherwise compromised.

A password or PIN may be stolen in several ways including detecting the keypad or keyboard using a physical sensor while the user enters his or her password or PIN or tapping into the electrical circuit or network downstream from the keypad or keyboard to capture the password or PIN after the user has entered it into the keypad or keyboard. Previous efforts have been focused on protecting PINs and passwords from this latter form of compromise; however, little work has focused on detection of secret data entry by physical sensors.

One way to steal a password or PIN using a physical sensor is to observe the keypad or keyboard as the user enters his or her PIN or password. This observation may be performed either visually or by means of an optical device such as a camera. Structures designed to prevent this type of monitoring are described in U.S. Pat. No. 5,748,728 to Ginsberg et al. entitled "Shield for Concealing Operation of a Keypad". These structures may have provided some protection of passwords and PINS when the eavesdropping threat was limited to optical sensors. However, such simple security measures are increasingly ineffective as new highly-sophisticated physical sensors become readily available. This new breed of physical sensors includes devices that detect infrared signatures as well as refined audio sensors.

Devices that create images by detecting the infrared portion of the electromagnetic spectrum are well-known. These devices typically have been used in the public sector as military and police personnel may often use them to image human beings and structures in low-light conditions. Rescue workers use these devices in search-and-rescue operations to locate persons trapped in damaged buildings. Firemen use them to locate hot spots in burning buildings. Additionally, infrared-imaging devices are used routinely for medical diagnostic purposes to image the human body and differentiate between body areas of normal temperature and those with abnormal temperature, which might indicate a disease process, injury, or the like. Some infrared detectors are so sensitive that they can image, for example, footprints in the ground, by discerning the slight difference between the average background temperature and a temperature that is slightly elevated as a result of human contact.

An eavesdropper could use a sensitive infrared-imaging device to inspect a keyboard or keypad shortly after a person has entered a secret such as a PIN thereon. The eavesdropper would prefer to perform the imaging after the person entering the PIN has left the area in order to remain undetected by the person entering the PIN. The infrared-imaging device would be used to create an image of the heat signature on the keypad. The heat signature on the keys most recently touched would be slightly more intense than those touched earlier in the PIN sequence. By comparing the temperature values for the keys and arranging them in sequence from the coolest to the warmest, the eavesdropper could form a strong hypothesis about the sequence in which the keys were touched.

For example, FIG. 1 shows a conventional data entry device as detected using an infrared-imaging device. In this figure, the data entry device 10 is a keypad with keys 11 on it. This image of the keypad is taken immediately after a user has entered his or her PIN. In the image, the background temperature is represented by white. Temperatures above the background temperature are represented by varying shades of gray with black being the hottest temperature. As shown in FIG. 1, the 6 key is the darkest shade of gray. The 5 key is a slightly lighter shade of gray. The 2 key is lighter still. Finally, the 1 key is the lightest shade of gray. Thus, the 1 key is the coolest and the 6 key is the warmest. Now arranging the keys in order from coolest to warmest, the eavesdropper learns that the user's PIN is 1-2-5-6. Depending on the accuracy of the temperature data, infrared imaging may immediately and unequivocally reveal the PIN. Even if the shades of gray are very close together, this imaging greatly reduces the number of combinations that must be tried to learn the secret PIN. For example, if the shades of gray in FIG. 1 had been indiscernible, the use of imaging would still have reduced the number of combinations that the eavesdropper must try from 10,000 to 24.

One way of thwarting infrared detection is to require that PIN numbers include one or more repeated digits. Keys that are touched more than once are likely to be warmer than would otherwise be the case. For example, if a PIN number were 1223, the heat signature would likely show that the 2 key is the warmest since it was touched twice, followed by the 3 key, with the 1 key being the coolest. Thus, an eavesdropper would incorrectly surmise that the PIN was 231. However, if the eavesdropper realized that the PIN contained four digits, knowing in advance that all PIN numbers have one or more repeated digits would merely reduce the number of combinations that must be tried. As a result, this method of thwarting infrared detection would actually reduce the PIN's effectiveness as a secret. Therefore, a strong need exists for a way of thwarting infrared detection of secret data entered into data entry devices without reducing the data's effectiveness as a secret.

Aside from infrared-imaging devices, eavesdroppers could use refined audio sensors to discover secret data, such as a PIN or password, without resorting to direct observation. To discover a PIN, an eavesdropper might place a hidden microphone attached to a recording device in position to detect sound generated by entering data into a data entry device. The eavesdropper could then subject the recorded sound to a sensitive analysis, such as a Fourier transform, of the audio spectrum associated with pressing each key on a keyboard or keypad. This analysis may yield a distinctive, repeatable audio signature for each key. Such analysis is now increasingly possible with the computing-power of ordinary, inexpensive personal computers. Each key may have a different audio signature based on its physical characteristics and it physical location. The physical characteristics of each key will be different for a number of reasons. Different physical characteristics occur as part of the manufacturing process. Each key is manufactured within relatively imprecise tolerances such that there is an extremely small likelihood that two keys on the same keypad are exactly alike. Additionally, over time the striking surfaces of the keys on a keypad experience varying degrees of wear. This non-uniform wear contributes to distinct audio signatures for each key on the keypad. The physical location of each key on the keypad also contributes to distinct audio signatures for each key. Since each key is physically located in a different place on the keypad, any echoes from nearby objects, such as a shield around the keypad of an ATM machine, may be different for each key pressed. This difference occurs as a result of sound waves bouncing off nearby reflectors at different angles and travelling different distances prior to reaching the microphone. This audio spectrum information, either alone or in combination with the aforementioned infrared imaging means, may yield a very high probability of uncovering a secret PIN without direct visual or optical observation of entry.

SUMMARY OF THE INVENTION

It is therefore an object of the present invention to provide methods and systems for protecting secret data entry from infrared eavesdropping.

It is another object of the present invention to provide methods and systems for protecting secret data entry from audio eavesdropping.

These and other objects are provided, according to the present invention, by a method for protecting a data entry device from eavesdropping that includes masking a signature of entry resulting from entry of data by a user of the data entry device so as to reduce the detectability of the signature by eavesdropping.

According to the present invention, the signature may include a temperature differential in the data entry device from data entry by the user and the masking may include controlling the external temperature of the data entry device to reduce temperature differentials left in the data entry device by the user.

In a preferred embodiment, controlling the external temperature of the data entry device includes maintaining the external temperature in a range surrounding a predetermined setpoint. The predetermined setpoint may be between about 35-40° C. By controlling heating and cooling, the temperature differentials in a data entry device that a user creates by entering data into the device may be reduced such that these temperature differentials are less detectable by an infrared-imaging device.

According to the present invention, the signature may also include sound waves emitted from the data entry device and the masking may also include masking sound waves emitted from the data entry device to reduce the detectability of the sound waves.

In a preferred embodiment, the masking of sound waves includes generating an interfering sound pattern so as to reduce the detectability of the sound waves. Generating the interfering sound pattern includes receiving the signature, converting the signature to an electrical signal, phase-shifting the electrical signal, converting the phase-shifted electrical signal to an audio signal, and emitting the audio signal in close proximity to the data entry device. By providing an interfering sound pattern, the sound waves created by data entry into a data entry device may be masked to reduce the detectability of the sound waves by audio eavesdropping.

According to the present invention, a system may also be employed for protecting data entry to a data entry device from eavesdropping. The system includes a data entry device and a means for masking a signature of entry resulting from entry of data by a user of the data entry device so as to reduce the detectability of the signature by eavesdropping.

In a preferred embodiment, the means for masking includes a means for establishing the external temperature of the data entry device to reduce temperature differentials left in the data entry device by the user.

In another preferred embodiment, the means for masking includes a means for masking sound waves emitted from the data entry device to reduce the detectability of the sound waves.

Methods and systems according to the present invention may therefore protect secret data entry into a data entry device by a user from infrared and audio eavesdropping. It will be understood that the present invention may be embodied as methods and systems and combinations thereof.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
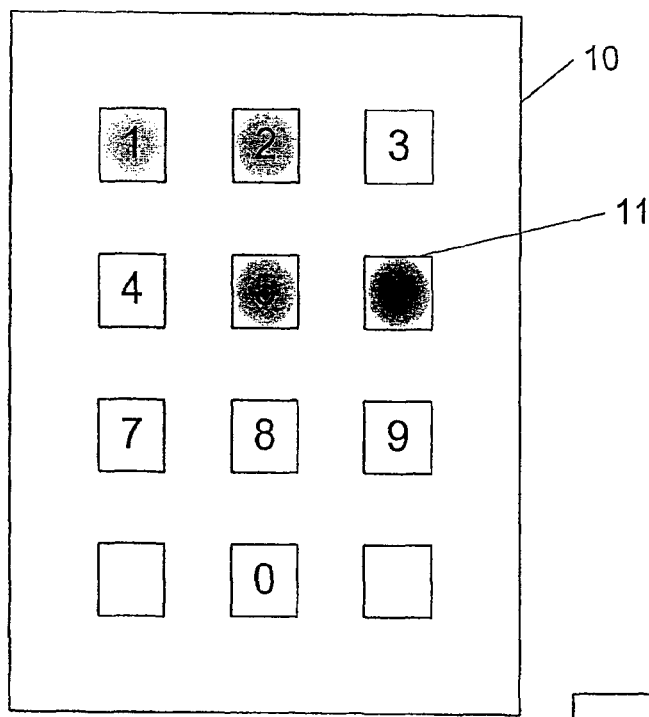
FIG. 1 illustrates a conventional data entry device immediately after use by a user.
Figure 2:
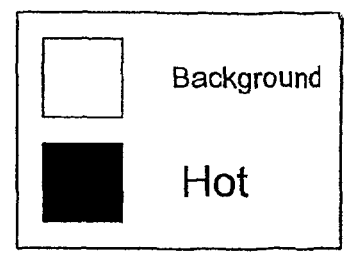
FIG. 2 illustrates a conventional data entry device immediately after use by a user after employing the present invention.
Figure 2:
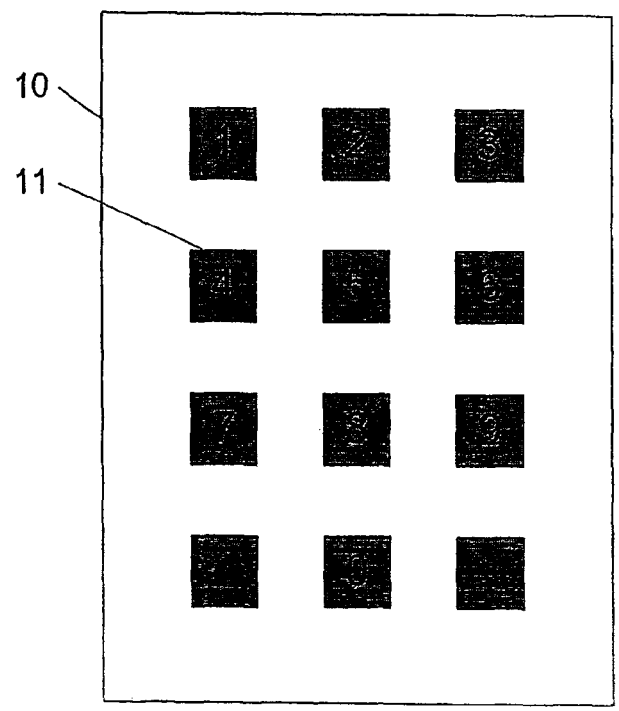

FIG. 2 shows a data entry device 10 that utilizes keys 11 for data entry. In FIG. 2, the assumption has been made that background temperature is less than the temperature of the user. The keys 11 have been heated above background temperature so as to mask any temperature differential that might be created in the keys 11 when a user utilizes them to enter data into the data entry device 10. This masking reduces the infrared detectability of the data entered into the data entry device 10. Of course if the background temperature were hotter than the temperature of the user, the keys 11 could be cooled to mask any temperature differential that might be created in the keys 11 when the user enters data into the data entry device 10. Various systems for masking temperature differentials in data entry devices to reduce infrared detectability are described in FIGS. 3-6.

Figure 3:
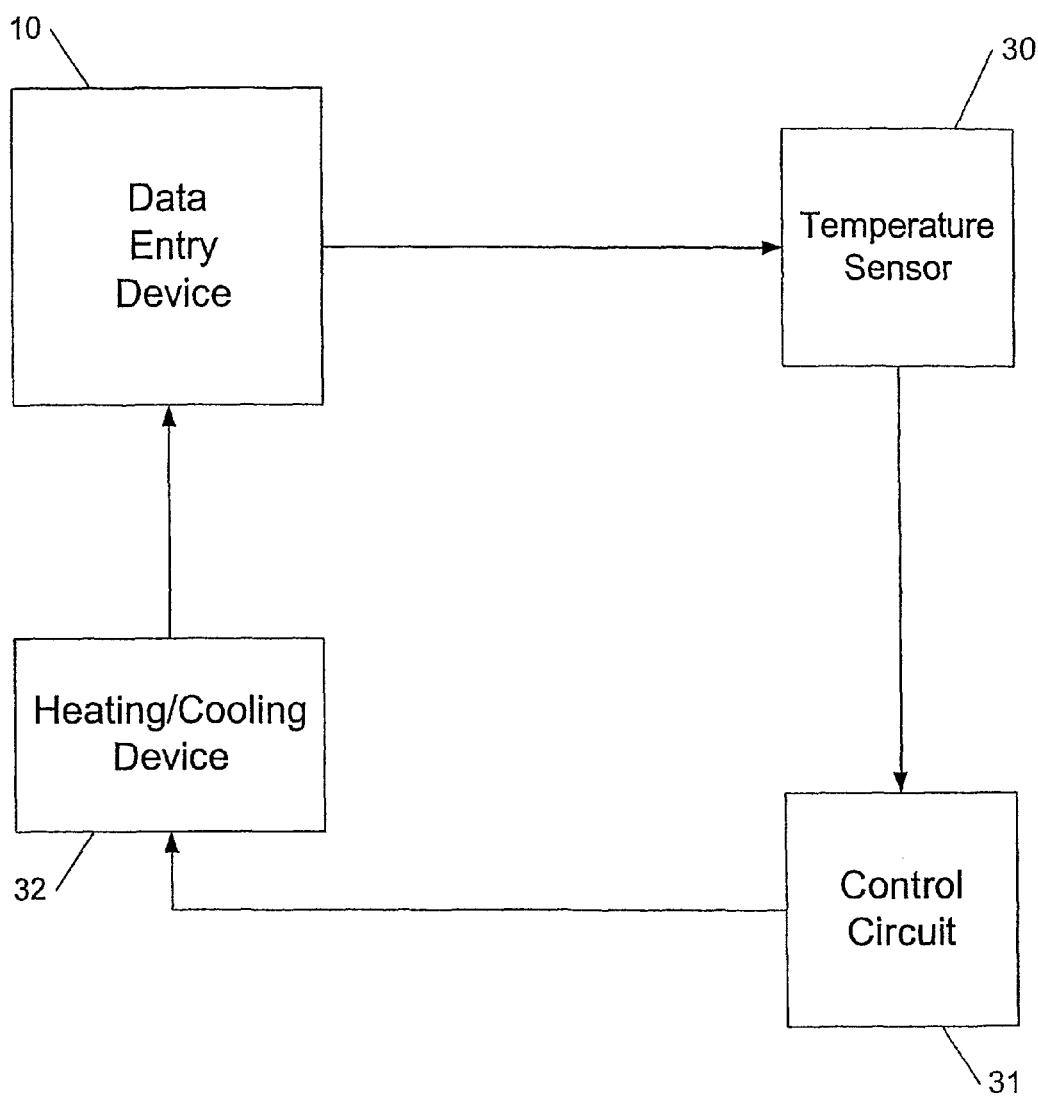
FIG. 3 illustrates a temperature feedback control circuit according to the present invention.

Referring now to FIG. 3, a feedback control circuit of the present invention will now be described. A temperature sensor 30 is operably associated with a data entry device 10. The temperature sensor 30 measures the temperature of the external surface of the data entry device 10. The temperature sensor 30 is also operably associated with a control circuit 31, which is operably associated with a heating/cooling device 32. The data entry device 10 may be a keypad, a keyboard, a touch-tone phone, or any other known data entry device. The temperature sensor 30 may conveniently be a thermocouple or any other known temperature-sensing device. The heating/cooling device 32 may be a resistive heating element, an infrared emitting lamp, a blower, or any other known means for providing cooling or heating to a data entry device.

Still referring to FIG. 3, the temperature sensor 30 provides the control circuit 31 with the external temperature of the data entry device 10. The control circuit 31 compares the external temperature of the data entry device 10 as measured by the temperature sensor 30 with a predetermined setpoint. If the external temperature of the data entry device 10 as measured by the temperature sensor 30 is higher than the predetermined setpoint, the control circuit 31 sends a signal to the heating/cooling device 32 directing it to cool the data entry device 10. This cooling continues until the external temperature of the data entry device 10 as measured by the temperature sensor 30 equals the predetermined setpoint. At that time, the control circuit 31 sends a signal to the heating/cooling device 32 directing it to stop cooling the data entry device 10. Similarly, if the external temperature of the data entry device 10 as measured by the temperature sensor 30 is lower than the predetermined setpoint, the control circuit 31 sends a signal to the heating/cooling device 32 directing it to heat the data entry device 10. This heating continues until the external temperature of the data entry device 10 as measured by the temperature sensor 30 equals the predetermined setpoint. At that time, the control circuit 31 sends a signal to the heating/cooling device 32 directing it to stop heating the data entry device 10. Suitable control circuits for carrying out temperature feedback control are known to those of skill in the art and need not be described further herein.

While FIG. 3 illustrates a feedback control system, as will be appreciated by those of skill in the art, an open loop system may also be utilized. Thus, for example, a heating source may be continuously operated. Also, while the present invention is described in FIG. 3 as both heating and cooling, as will be appreciated by those of skill in the art, only one of heating or cooling may be needed. Thus, the present invention should not be construed as limited to both heating and cooling.

Figure 4:
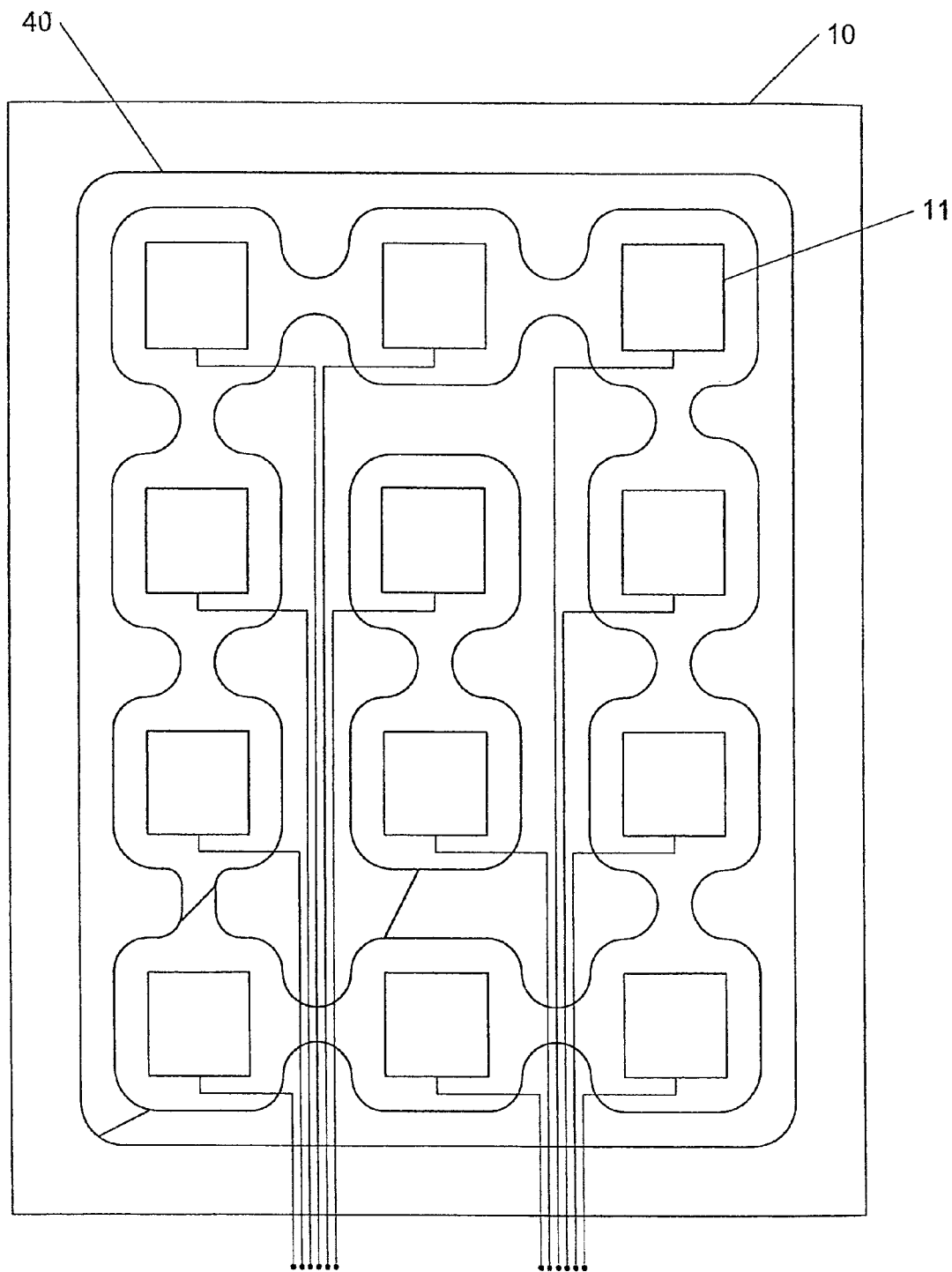
FIG. 4 illustrates a system for providing resistive heat to a data entry device according to the present invention.

Referring now to FIG. 4, a system for resistively heating a data entry device 10 of the present invention so as to reduce temperature differentials left in the data entry device by the user will now be described. Keys 11 reside on a data entry device 10. A resistive heating element 40 also resides on the data entry device 10 such that the resistive heating element 40 provides heat to the keys 11 when an electrical current is applied to the resistive heating element. The resistive heating element 40 may conveniently be a resistive pattern of wires surrounding the keys 11. The resistive heating element 40 could also be a resistive layer formed as part of a data entry device 10, which is formed using methods such as those described in U.S. Pat. No. 5,828,016 to Grannan et al. entitled "Low Profile Tactile Switch", the disclosure of which is incorporated herein by reference. The keys 11 could be constructed from a thermally conductive material such as aluminum, copper, nickel, or any other thermally conductive material. Alternatively, the keys 11 could be plated with a thermally conductive material such as aluminum, copper, nickel, or any other thermally conductive material.

Figure 5:
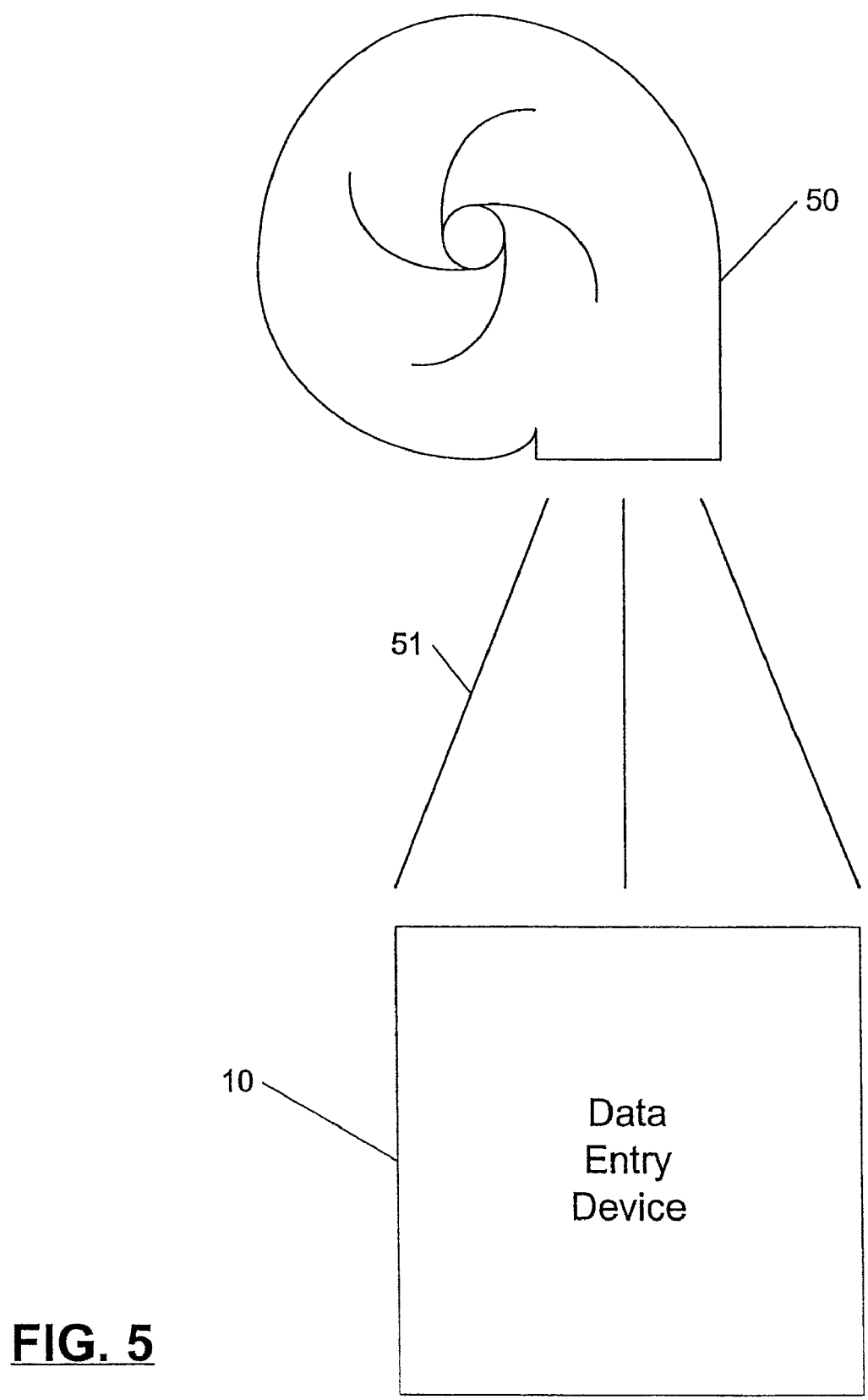
FIG. 5 illustrates a system for providing convective heat in proximity to a data entry device according to the present invention.

Referring now to FIG. 5, a system for heating or cooling a data entry device 10 by convection will now be described. A blower 50 directs a stream of air 51 in close proximity to a data entry device 10. The stream of air 51 may be temperature-controlled such that it is hotter or cooler than the data entry device 10. The stream of air 51 may blow directly on the data entry device 10, thus heating or cooling the surface of the data entry device 10. Heating the device using the stream of air may reduce the temperature differentials in the data entry device created when a user enters data into the device. Alternatively, or concurrently, the stream of air 51 could be directed so as to form a thermal curtain in front of the data entry device 10. The thermal curtain could mask temperature differentials created when a user enters data into the data entry device 10 by forming a thermal barrier in front of the data entry device 10. If an eavesdropper attempted to image the data entry device 10 with an infrared-imaging device, the thermal barrier would create an image on the device that masks the image of the data entry device 10. As viewed using the infrared-imaging device, the thermal barrier may appear to be a substantially opaque curtain draped in front of the data entry device 10.

Figure 6:
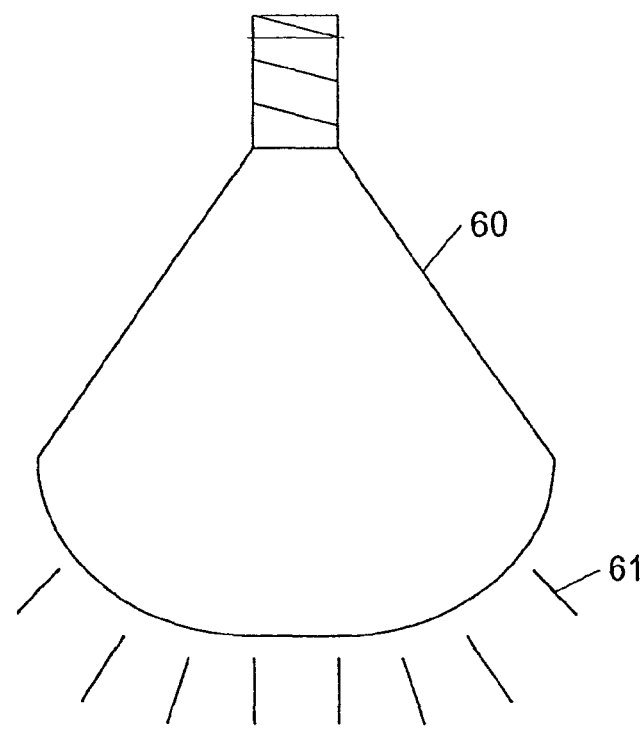
FIG. 6 illustrates a system for radiating heat in proximity to a data entry device according to the present invention.
Figure 6:
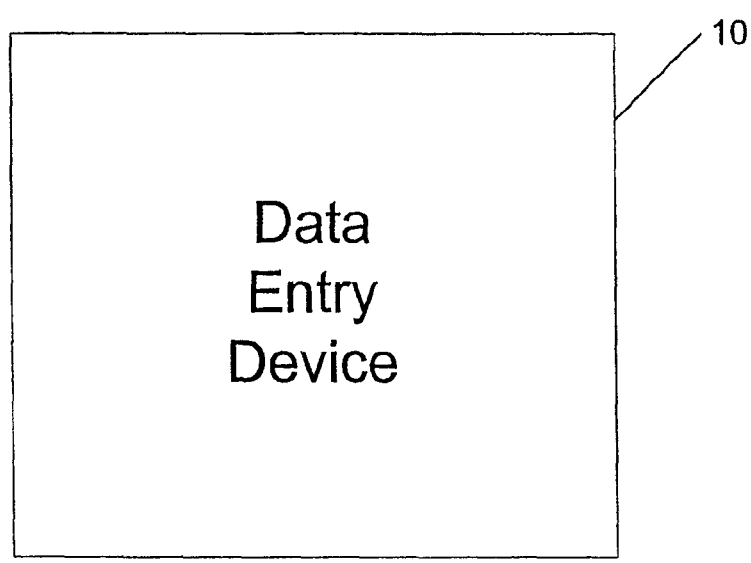

Referring now to FIG. 6, a system for heating a data entry device 10 by radiation will now be described. An infrared emitting lamp 60 is operably associated with a data entry device 10. The infrared emitting lamp 60 radiates heat 61 in proximity to the data entry device 10. The infrared emitting lamp 60 may radiate directly onto the data entry device 10, thus heating the surface of the data entry device 10. Alternatively, or concurrently, the infrared emitting lamp 60 may radiate in front of the data entry device 10 forming a thermal curtain in front of the data entry device 10. As with the stream of air, the thermal curtain could mask temperature differentials created when a user enters data into the data entry device 10 by forming a thermal barrier in front of the data entry device 10. If an eavesdropper attempted to image the data entry device 10 with an infrared-imaging device, the thermal barrier would create an image on the device that masks the image of the data entry device 10. As viewed using the infrared-imaging device, the thermal barrier may appear to be a substantially opaque curtain draped in front of the data entry device 10.

The foregoing Figures and descriptions have shown how the present invention can be used to reduce temperature differentials left in a data entry device when a user enters data into the device. However, the present invention is not limited to protecting data entry to a data entry device from thermal eavesdropping. The present invention also is directed to protecting data entry to a data entry device from audio eavesdropping. Various systems for masking sound waves created by data entry into data entry devices to reduce audio detectability are described in FIGS. 7-8.

Figure 7:
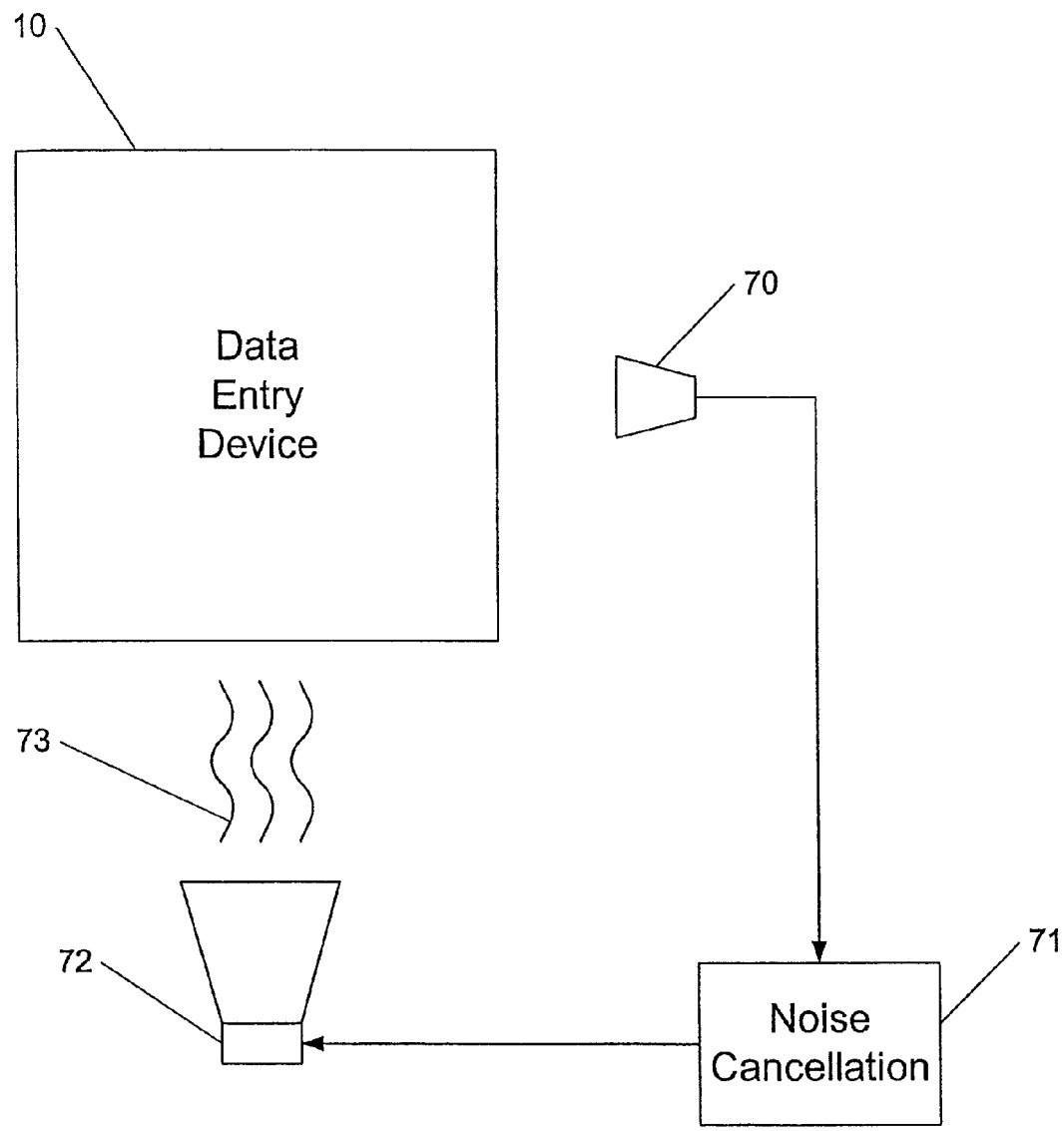
FIG. 7 illustrates a noise cancellation circuit according to the present invention.

Referring now to FIG. 7, a system for canceling the sound waves produced by entering data into a data entry device 10 will be described. A sensitive microphone 70 is operably associated with a data entry device 10. The sensitive microphone 70 receives sound waves produced by the entering of data into a data entry device 10 by a user. The sensitive microphone 71, which is also operably associated with a noise cancellation circuit 71, converts the sound waves to an electrical signal and sends the electrical signal to the noise cancellation circuit 71. After receiving the electrical signal, the noise cancellation circuit 71 shifts the phase of the electrical signal, preferably by 180°. The phase-shift may be accomplished in real time using an adaptive digital signal processor such as those known to those skilled in the art. The processor delays components of the audio spectrum by one-half wavelength so that they are out of phase with the audio inputs. Then, the noise cancellation circuit 71 sends the phase-shifted electrical signal to a speaker 72. The speaker 72 is located in close proximity to the data entry device 10. The speaker 72 converts the phase-shifted electrical signal to an audio signal. The speaker then emits sound waves 73 corresponding to the audio signal. The emitted sound waves 73 may be substantially 180° out of phase with the sound waves produced by the entry of data into the data entry device 10 by a user. Thus, the emitted sound waves 73 may substantially cancel the produced sound waves such that the operation of the keys on the data entry device may be undetectable by a listening device or have insufficient level to be differentiated from each other or background noise.

Figure 8:
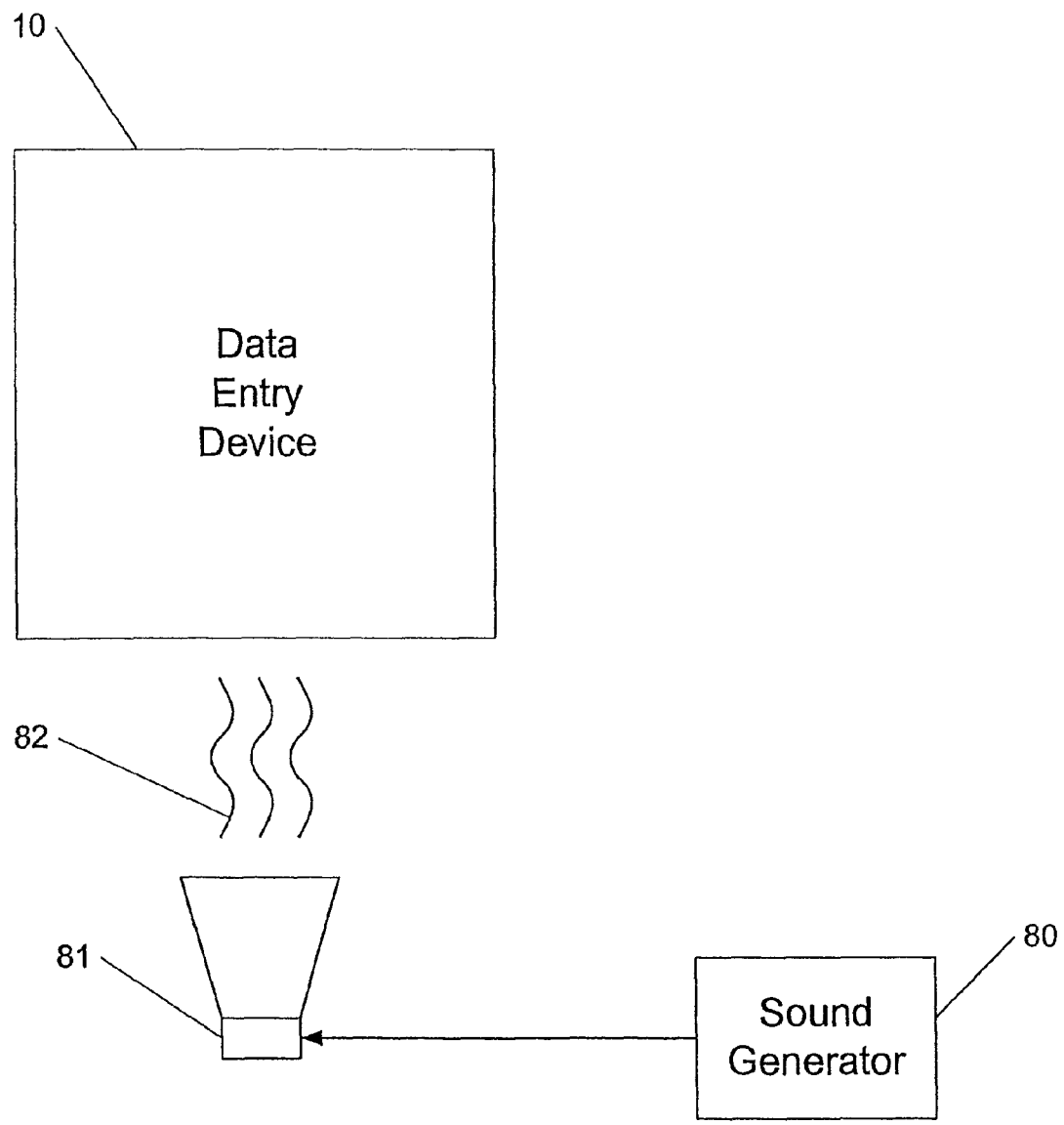
FIG. 8 illustrates a system for providing an interfering sound pattern using a sound generator according to the present invention.

Referring now to FIG. 8, a system for providing an interfering sound pattern using a sound generator will be described. A sound generator 80 is operably associated with a speaker 81, which is operably associated with a data entry device 10. In a preferred embodiment, the sound generator 80 generates an electrical signal corresponding to pre-recorded sounds. The pre-recorded sounds are recorded sounds of random input to the data entry device 10. The sound generator 80 sends the electrical signal to the speaker 81. The speaker 81 converts the electrical signal to an audio signal and emits sound waves 82 corresponding to the audio signal in proximity to the data entry device 10. By generating an interfering sound pattern, the operation of the keys on the data entry device may be undetectable by a listening device or have insufficient level to be differentiated from each other or background noise.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for protecting data entry to a data entry device from eavesdropping, wherein a signature of data entry comprises sound waves emitted from the data entry device, comprising:

masking the signature of data entry resulting from entry of data by a user of the data entry device so as to reduce the detectability of the signature through eavesdropping by generating an interfering sound pattern so as to reduce the detectability of the sound waves, said generating an interfering sound pattern comprising emitting pre-recorded sounds comprising recorded sounds of random input to the data entry device.

2. The method of claim 1, wherein the data entry device is a keypad or keyboard.

3. The method of claim 1, wherein the pre-recorded sounds are emitted by a sound generator.

4. The method of claim 3, wherein the sound generator comprises a speaker.

5. The method of claim 3, wherein the sound generator is operably associated with the data entry device.

* * * * *